United States Patent [19]

Ehrreich

[11] Patent Number: 5,305,644

[45] Date of Patent: Apr. 26, 1994

[54] FORCE SENSOR

[75] Inventor: John Ehrreich, Maynard, Mass.

[73] Assignee: Ercon, Inc., Waltham, Mass.

[21] Appl. No.: 918,656

[22] Filed: Sep. 2, 1992

Related U.S. Application Data

[60] Division of Ser. No. 599,277, Oct. 16, 1990, Pat. No. 5,194,205, which is a continuation of Ser. No. 323,283, Mar. 14, 1989.

[51] Int. Cl.⁵ .............................................. G01B 7/16
[52] U.S. Cl. ........................................ 73/774; 338/5; 338/99
[58] Field of Search ................ 73/862.629, 862.632, 73/862.636, 774; 338/5, 6, 99, 114

[56] References Cited

U.S. PATENT DOCUMENTS

| | | |
|---|---|---|
| 2,156,871 | 5/1939 | Rittenhouse . |
| 2,445,660 | 7/1948 | Bruestle ........................ 338/114 |
| 2,922,195 | 1/1960 | Ludy et al. . |
| 3,629,774 | 12/1971 | Crites ............................ 338/114 |
| 4,067,102 | 1/1978 | DuRocher et al. . |
| 4,067,945 | 1/1978 | DuRocher . |
| 4,273,682 | 6/1981 | Kanamori .................. 338/114 X |
| 4,419,653 | 12/1983 | Waigand ...................... 338/114 |
| 4,441,097 | 4/1984 | Anderson ..................... 340/365 |
| 4,617,433 | 10/1986 | Hoshikawa et al. .......... 200/86 R |

FOREIGN PATENT DOCUMENTS

| | | |
|---|---|---|
| 1039832 | 10/1953 | France . |
| 54-117581 | 9/1979 | Japan . |
| 1107362 | 10/1967 | United Kingdom . |
| 1380061 | 1/1975 | United Kingdom . |
| 2183101 | 5/1987 | United Kingdom . |

OTHER PUBLICATIONS

Proceedings of the Annual International Conference of the IEEE Engineering in Medicine and Biology Society, G. Harris et al., New Orleans, La., Nov. 4–7, 1988 (vol. 10, 1988).

N.I.T.S. Technical Notes No. 2301, NASA Brief, Jul. 1986, No. 7 Part F, Springfield, Va.

Patent Abstracts, Japan, vol. 6, No. 30 (P-103)(908), Feb. 23, 1982.

International Search Report of International Application No. PCT/US90/01144 (filing date Feb. 28, 1990) Mailed by the International Searching Authority on Apr. 7, 1990.

*Primary Examiner*—Jerry W. Myracle
*Attorney, Agent, or Firm*—Lahive & Cockfield

[57] ABSTRACT

A force sensor component comprising a dimensionally stable body of electrically conductive material, the body having a selected outer surface formed into a predetermined topography; the body including an electrically conductive material in an amount sufficient to render the body electrically conductive at least throughout the selected outer surface of the body; the predetermined topography of the outer surface of the body comprising a plurality of interconnecting ridges across the outer surface of the body.

18 Claims, 4 Drawing Sheets

FORCE SENSOR

This is a division of application Ser. No. 07/599,277 filed Oct. 16, 1990 and now U.S. Pat. No. 5,194,205 which is a continuation of application Ser. No. 07/323,283 filed Mar. 14, 1989.

BACKGROUND OF THE INVENTION

The present invention relates to working components in force sensors and more particularly to force sensor components having an operable irregular surface topography which comprises a plurality of interconnecting ridges which reinforce each other against bending.

There has developed a need for pressure sensitive conductive components. For an electrical switch which normally has only on and off positions, a need has arisen in the ability of the switch to vary current flow with the degree of pressure between the components which close the switch. Such force sensor components could be incorporated into music synthesizers such as keyboards, drums, woodwinds, and the like where the touch of the musician may determine the volume, timbre, or the like of the instrument. Similarly such force sensitive components could be incorporated into product components for computers (e.g., graphics pads), television, and stereo controllers, security pressure sensors, biomedical devices, robots and household appliances.

The force sensor components of the invention may be used for purposes of making direct contact with or being used in close proximity with conductive circuitry. The performance of the force sensor components herein at different pressures could be utilized to vary a variety of different electrical properties such as resistance or voltage and with a dielectric layer in between as a function of its capacitance properties. Prior force (or pressure or weight) sensitive resistors have been developed which employ patterned surfaces having compressible conductive protrusions, peaks, fingers and the like or rigid conductive particles mounted on deformable bases. Such prior force sensors depend in their performance on force exerted on the tips or top ends of protrusions. When contact under force is made between the force sensor and the circuit or other conductive surface by which a circuit is to be closed, the tips or top ends of the protrusions can bend or buckle. Another disadvantage in using such systems is that the tips or top ends of protrusions provide a limited surface area for enabling electrical conductivity contact even if the peaks or protrusions are compressible. Prior force sensors also typically provide a relatively limited performance range over which conductivity may increase with pressure and vice versa.

SUMMARY OF THE INVENTION

The force sensor components of the invention are formed as an inverse impression of a mold molded onto a surface of a body of conductive material. The molded surface comprises a plurality of interconnecting ridges. Where the force sensor component includes compressible material, it can act to alter electrical properties according to the degree of compression exerted on the force sensor component by increasing the surface area of the ridges of the molded surface which are in contact with a selected electrical component, by increasing the number of ridges on the molded surface which may come into contact with the electrical component (inasmuch as in the typical case the ridged surface comprises a plurality of ridges of varying heights), and by deceasing the distance between the base of the force sensor component and the surface(s) of the electrical component with which it mates.

In accordance with the invention there is provided a force sensor component comprising a dimensionally stable body of electrically conductive material, the body having a selected outer surface formed into a redetermined topography; the body including an electrically conductive material in an amount sufficient to render the body electrically conductive at least throughout the selected outer surface of the body; the redetermined topography of the outer surface of the body comprising a plurality of interconnecting ridges across the outer surface of the body.

The stable body typically comprises a polymer and is rendered electrically conductive by the addition of a conductive filler. The polymer is typically compressible and resilient but may also be rigid.

The ridged topography of the selected outer surface is preferably formed as an inverse impression from a mold.

The electrically conductive material is typically homogeneously dispersed throughout the stable body, and is preferably selected from the group consisting of carbon powders, graphite powders, silver powders, silver flakes, noble metal powders, noble metal flakes, silver coated copper powder, silver coated nickel powder, silver coated glass powder, silver coated aluminum powder, nickel powders, nickel flakes, nickel coated glass, aluminum powders, graphite fibers, metal fibers, chopped metal filaments, conductive metal powders, conductive metal flakes, conductive inorganic, conductive ceramics, and mixtures of two or more of the foregoing.

The polymer is typically a thermoplastic or thermosetting form stable polymer and most preferably is a form stable compressible resilient polymer such as a rubber. In accordance with the invention there is also provided a process for forming a force sensor component comprising selecting a conductive material formable into a dimensionally stable body; selecting a mold having an inverse surface impression comprising pluralities of adjoining ridges; molding the conductive body having the pluralities of adjoining ridges thereon. Typically, the ridges vary in heights, and the majority of the adjoining ridge heights are greater than one half the height of the highest ridge. The maximum height of the highest ridges is typically less than about 100 mils. The mold preferably comprises granules of inorganic, metals, and/or plastics bonded to a surface. The step of molding the conductive material typically comprises pressing the material into a sheet having a smooth impressionable surface, applying the smooth surface of the sheet to the mold under pressure for a period of time and at a temperature sufficient to form the inverse impression of the mold on the surface of the sheet.

Alternatively, the mold may comprise a unitary structure having a surface into which is formed a contour having an inverse impression comprising a plurality of interconnected ridges.

The conductive material may also be applied to the mold where appropriate by any conventional means such as injection molding, cast coating, knife coating, extrusion, calendaring and heat lamination.

DETAILED DESCRIPTION OF PREFERRED EMBODIMENTS

A force sensor component of the invention may be prepared as a moldable admixture of a non-conductive organic material and a conductive material dispersed throughout the organic material. The organic material and the conductive material are typically initially admixed and formed into a moldable or impressionable sheet and the sheet is applied to a mold so as to form the inverse impression of the mold on one surface of the conductive sheet. The initial admixture of the particular organic and conductive materials may be treated in a conventional manner, if necessary, such as by addition of suitable solvent, heating or the like so as to render the admixture susceptible to being readily molded. Depending on the particular organic and conductive materials selected, a molded sheet formed therefrom is typically cured such as by drying, air curing, heat treatment and the like so as to cure the molded sheet material into a dimensionally stable structure which maintains the inverse impression of the mold. The organic material is typically a polymer which is thermoset or is a thermoplastic.

Depending on the particular organic and conductive materials selected, the admixture thereof may be applied to the selected mold by pressure molding, injection molding, cast coating, knife coating, extrusion, calendaring, heat lamination and the like.

A typical organic material upon curing is compressible and resilient and preferably comprises a rubber or a compressible plastic. Typical rubbers are silicones, isobutylene-isoprene (IBR), chloroprene (CR), natural rubber, ethylene-propylenediene terpolymer (EPDM), nitrile-butadiene, styrenebutadiene, polysulphides and urethanes. Preferred compressible plastics are plasticized polyvinyl chloride, polyurethane, ethylene copolymers, acrylate copolymers, polyesters, polyethylene-polyisobutylene and polyvinyl acetate copolymers. Mixtures of two or more compatible ones of all of the foregoing are also suitable.

In applications where the force sensor component may be used in conjunction with a circuit, capacitance or other electrical component which is itself compressible or deformable (or at least the mating surface thereof), the force sensor component may be rigid. Typical organic materials which might be employed for use in such force sensor components are rigid plastics such as polypropylene, polyethylene, polystyrene, phenolic epoxy, polyamide and polycarbonate.

The conductive material to be admixed with the organic material are preferably polymers, carbon containing fillers, metal fillers and other inorganic fillers which are relatively highly conductive. Typical conductive materials are metals; conductive ceramics and salts; conductive polymers including polyacetylene polymers; carbon powders such as conductive acetylene blacks, furnace blacks and graphites; chopped graphite filaments; silver flakes and other noble metal powders; metal coated carbon fibers; silver coated lass and metal powders such as copper, aluminum, nickel; metal powders such as nickel, copper, aluminum and stainless steel; and conductive zinc oxide. Mixtures of two or more of the foregoing are also suitable.

Alternatively to the use of an admixture of organic and conductive material, the material of the force sensor component may comprise an inherently conductive polymer such as doped polyacetylene and poly(sulphur nitride).

The molds contemplated for use in forming the force sensors of the invention are constructed such that the inverse impression of the mold results in an impression which comprises a plurality of interconnected ridges, such ridges are attached to a base (typically integral therewith) and connected to each other (typically integrally) reinforcing each other against bending and buckling when under compression. The uppermost surfaces of the ridges are preferably curved or curvilinear. The sides of the ridges extend downwardly from their curved or curvilinear uppermost surfaces and diverge (flare) away from each other downwardly toward their bases. The ridges preferably interconnect with each other at or above about one-half the distance of their uppermost surface extensions. One embodiment of a suitable mold typically comprises a flat surfaced dimensionally stale base onto which a plurality of particles of various shapes and sizes are deposited and adhered. The particles may comprise any inert material such as a metal, inorganic material or polymer. The maximum linear dimension of the plurality of particles deposited on a typical mold base surface may range in size over a selected range or the particles may all have the same or substantially the same size. The maximum linear dimension of the particles deposited on the base surface of a typical mold is typically less than about 100 mils. Examples of such particle deposited molds are sandpaper, emery cloth and the like. The particles in such molds are bonded to the base surface of the mold, typically by adhesive bonding, imbedding of the particles in the base such as by softening the surface of the base and allowing it to solidify with the particles imbedded therein or the like.

Molds according to the invention may also be constructed by punching, drilling or etching a flat base (unitary) surface. Such molds are less preferred in that the punching, drilling or etching must be conducted so as to create an inverse impression which comprises a plurality of interconnected ridges as described above. Such drilling or etching is typically difficult to effect without forming an inverse impression having bendable fingers, peaks or protrusions.

As described above the conductive admixture is typically applied to the mold in order to form the inverse impression thereof. In some applications, e.g. with respect to some particle deposited molds, the particles ma have undercuts between the article and the base surface, open pockets or other peculiarities which may cause the applied conductive admixture to attach under, to or around the particle such that when the conductive admixture is stripped off of the mold, one or more particles remain attached to the surface of the molded conductive admixture. In such cases, it may be desirable to apply a thin film of non-stick material, such as a Teflon, fluorinated ethylene propylene copolymer or the like, over the irregular surface of the mold before applying the conductive admixture to be molded. The non stick material is applied in a film thin enough to effectively and substantially assume the contour of the mold surface. Alternatively, a selected amount of a non stick material may be incorporated into the admixture of organic/conductive material in an amount sufficient to obviate attachment of the conductive admixture to the particles of the mold. The amount of any such non stick material which might be added to the conductive admixture is added in an amount which does not substantially affect the hardness, curability, compressiveness and conductivity of the otherwise untreated admixture. Typically, the amount of any such non-stick material added to the conductive admixture comprises less than about 7% by weight of the admixture.

The following description is provided for purposes of illustrating how a variety of different force sensor components having different properties, e.g., inverse mold impressions, are each capable of generating a useful varying relationship between the force applied (between the inverse ridged surface of the force sensor and a circuit surface(s) to be completed) and the voltage flow through a circuit completed with the force sensors.

Although the data reported in FIGS. 2-6 demonstrates how voltage in a circuit may be controllably varied with the degree of pressure, it should be recognized that a variety of other properties may be controllably varied using force sensor components of the invention such as capacitance (e.g., where the force sensor component is used in conjunction with a dielectric film), conductivity, resistance and the like. It should be further recognized that the specific exemplary force sensor components to which the data of FIGS. 2-6 correspond, are set forth for purposes of illustration only, demonstrating variations in only one measured performance factor (i.e., voltage) among specific examples which vary only some of the properties (e.g., surface topography, hardness, conductivity), which can be selectively varied in any given force sensor component according to the invention.

Figure 1:
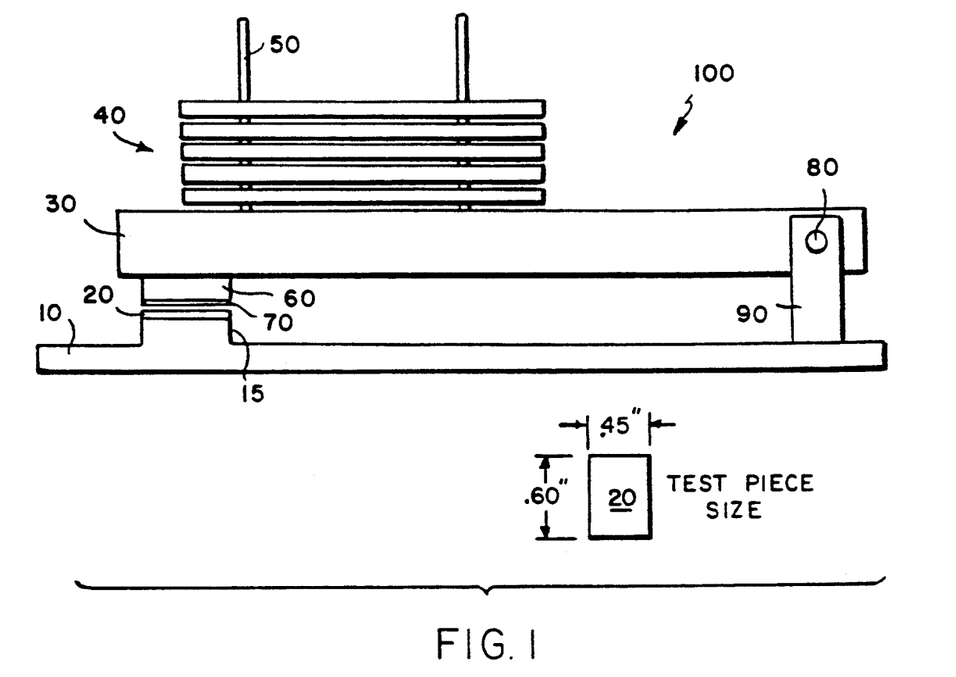
FIG. 1 is a side schematic view of the pressure/voltage generating and measuring apparatus utilized to generate and measure the data reported in FIGS. 2-6 with respect to the force sensor materials manufactured according to Examples 1-10 herein.

The voltage and force (in ounces) data reported in FIGS. 2-6 hereinafter were all recorded by use of the apparatus depicted in FIGS. 1, 1A. As shown in FIG. 1, the voltage versus force measuring device 100 comprises a force delivery arm 30 pivotably connected to a support post 90 at a pivot point 80. A generally rectangular piece of spacer material 60 typically a felt or other cloth material is attached to the undersurface of the arm 30 at its free rotatable end. A generally rectangular piece of force sensor material 70 to be tested is attached to the undersurface of the spacer 60 with the inverse ridge molded surface of the test material 70 facing downwardly in readiness for contacting the upper surfaces 110 of an interdigitated finer circuit 20. The interdigitated finger circuit 20 is situated on top of a protrusion 15 on a base 10 which is in turn connected to the pivot post 90. The protrusion 15 is appropriately positioned and configured on base 10 so as to effect an essentially parallel mating between the top surface 110 of interdigitated circuit 20 and the outermost protruding ridges on the inverse ridge molded surface of the test sensor 70. As shown in FIG. 1, guide posts 50 are provided on the upper surface of pivot arm 30 for purposes of successively mounting weights 40 on arm 30 (five such weights are shown in FIG. 1 for purposes of illustration).

In a typical measuring operation, one or more weights 40 are placed on guide posts 50 thus exerting a selected downward force on arm 30 and simultaneously exerting a selected force between the mating surfaces of test sensor 70 and circuit 20. With the specifically configured device 100 and weights 40 utilized in generating the data reported in FIGS. 2-6, about three (3) ounces of force was exerted at the center of the mating area between sensor 70 and circuit 20 per each weight 40 employed.

Figure 1A:
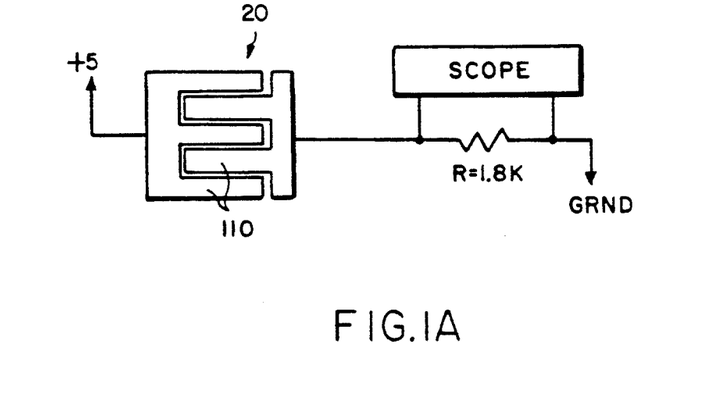
FIG. 1A is a top, schematic view of the interdigitated circuit element of the apparatus of FIG. 1.
Figure 2:
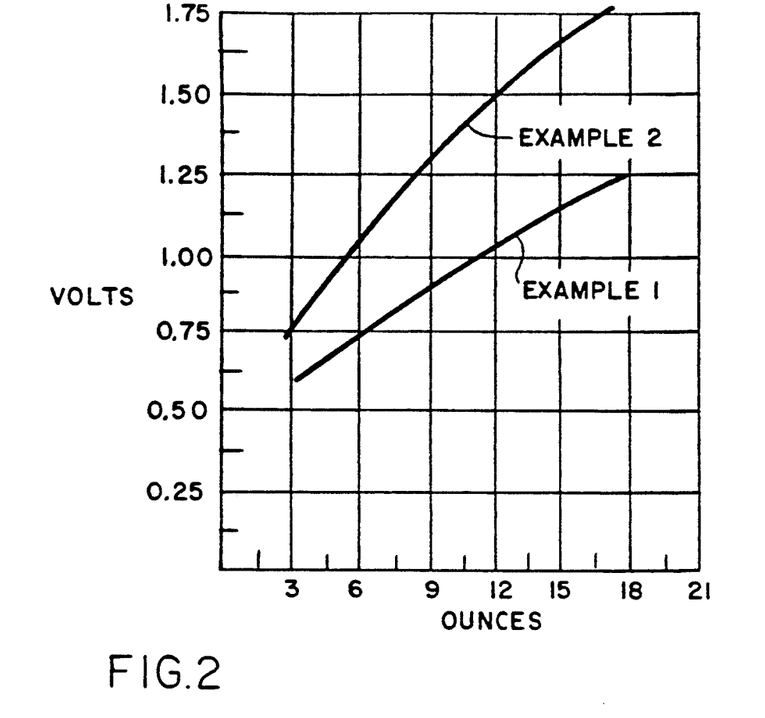
FIG. 2 is a plot of pressure versus voltage test data carried out on the force sensor materials manufactured according to Examples 1 and 2 as described hereinafter.
Figure 3:
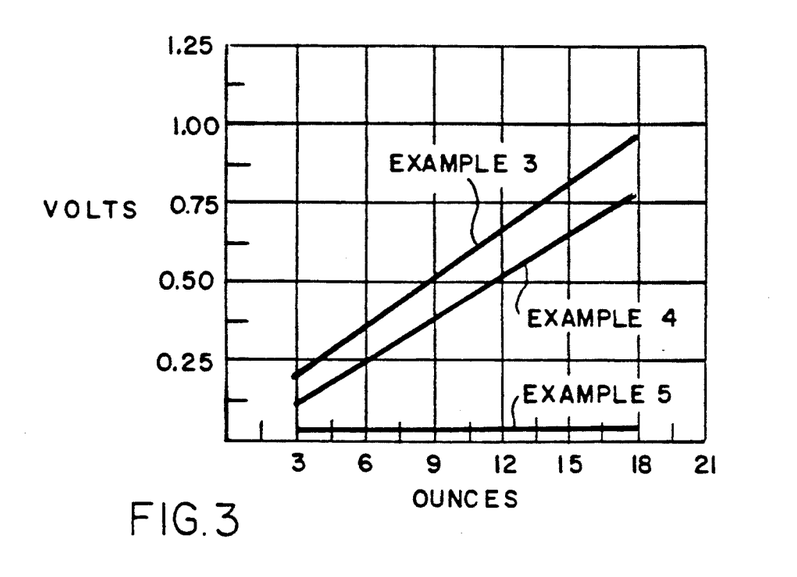
FIG. 3 is a plot of pressure versus voltage test data carried out on the force sensor materials manufactured according to Examples 3, 4 and 5 as described hereinafter.
Figure 4:
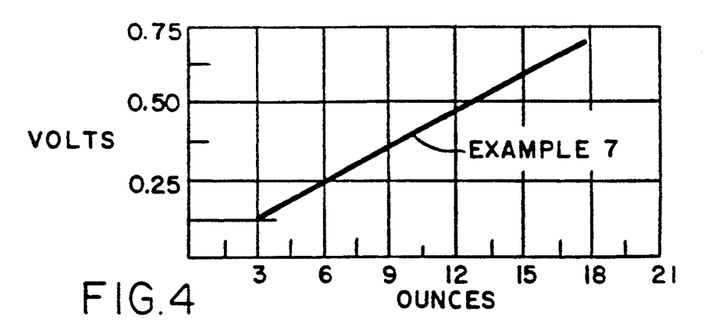
FIG. 4 is a plot of pressure versus voltage test data carried out on the force sensor material manufactured according to Example 7 as described hereinafter.
Figure 5:
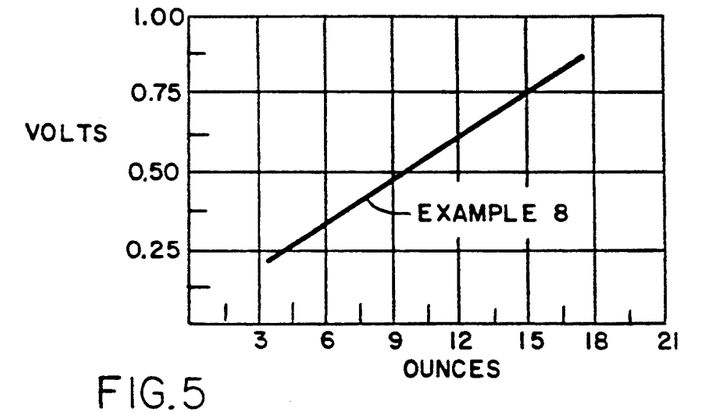
FIG. 5 is a plot of pressure versus voltage test data carried out on the force sensor material manufactured according to Example 8 as described hereinafter.

As shown in FIG. 1A, from a top view of circuit element 20, the circuit 20 comprises a series of interdigitated fingers which is closed when the outer inverse ridge molded surface of sensor 70 mates with the top surface 11 of the circuit 20. As shown in FIG. 1A the circuit is appropriately connected to a digital oscilloscope for measuring the voltage in the circuit 20 when closed. The voltage data reported in FIGS. 2-7 was all recorded at a time of about 2.5 seconds after the arm 30 was manually released so as to allow the opposing surfaces of test sensor 70 and circuit 20 to mate. It is believed that 70-80% of the rise in conductivity (and concomitant rise in voltage) that occurs in the circuit 20 will occur 2.5 seconds after the arm 30 is manually released.

It is noted that the specific test apparatus of FIGS. 1, 1A, was employed for purposes of convenience and illustration only, the nature of the exemplary force sensor components of Examples 1-8, 10, lending themselves to ready measurement with such an apparatus. The variation in performance with respect to other electrical properties, as noted above, could, of course, also be measured using suitable measuring apparatus. It is further noted that although test performance data is not reported with respect to a rigid (non compressible) force sensor component (e.g., the force sensor component of Example 11 hereinbelow), a suitable apparatus incorporating, for example, a circuit component having a compressible mating surface, could be employed to test such a rigid force sensor component.

EXAMPLE 1

400 grams of Parker Seal S-6600 conductive carbon-black loaded silicone compound (available from Parker Seal Group, Lexington, Ky.) was admixed with 400 grams of SE-33, a silicone gum (available from General Electric Co., Waterford, N.Y.) and 16 grams of 50% active Varox powder, (25 Dimethyl, 2,5, Di(t-butyl peroxy, hexane), (available from R. T. Vanderbilt, New York, N. Y.). 25 grams of this admixture was rolled into a sheet of about 60 mils in thickness between a pair of 5 mil thick sheets of ICI 505 polyester film. One of the polyester sheets was removed to expose a flat surface of the rolled out sheet of conductive rubber admixture. This flat exposed surface was placed on top of the rough surface of a sheet of 3M-9085, Super Fine #400, silicon carbide sandpaper (available from 3M Co., St. Paul, Minn.). The mated sandpaper and conductive rubber sheets were sandwiched between aluminum plates and a 32 mil aluminum chase and placed in a 12"×12" Walbash platen press. The sandwich was pressed at 335° F. under 2000 lbs. of pressure for 20 minutes. The inverse ridge molded conductive rubber sheet was then removed and postcured for about four hours at 185° C. in an oven. The hardness of the cured and molded conductive rubber sheet was measured and found to be 40 Shore A. Three separate pieces of about 0.625"×0.40" in dimension were cut out of the cured conductive rubber sheet and separately subjected to the various pressures (in ounces) reported in FIG. 2 (in the FIG. 1 apparatus) and yielded the average voltage outputs reported in FIG. 2.

EXAMPLE 2

The procedure of Example 1 was followed (repeated) except that 3M-9088, Very Fine #240, silicon carbide sandpaper was employed as the mold. The various pressures employed and average voltage outputs obtained are reported in FIG. 2.

EXAMPLE 3

The procedure of Example 1 was followed (repeated) except that 3M Emery cloth, medium grade (available from 3M Co.) was employed as the mold. The various pressures employed and average voltage outputs obtained are reported in FIG. 3.

EXAMPLE 4

The procedure of Example 1 was followed (repeated) with the following modifications: (a) 2 grams of Hi-Sil T-600 (amorphous silica), (PPG Industries, Inc., Pittsburgh, Pa.), was further admixed with 15 grams of the above-described admixture of Parker Seal S-6600, SE-33, and Varox powder; (b) 17 grams of the admixture was pressed into a 40 mil thick sheet instead of a 60 mil thick sheet, (c) 3M Emery cloth, medium grade was employed as the mold, (d) the Emery cloth mode was pre-heat treated for 2 minutes at 185° C. immediately prior to its placement in the Walbash press and (e) the sandwich was pressed under 4,000 lbs. of pressure rather than under 2,000 lbs. The hardness of the subsequently cured sensor sheet was measured and found to be 70 Shore A. The various pressures employed and average voltage outputs obtained from three separate pieces of the conductive rubber sheet are reported in FIG. 3.

EXAMPLE 5

The procedure of Example 4 was followed (repeated) with the following modification: 5 grams of SE-33 was admixed with 15 grams of the Parker Seal S-6600/SE-33/Varox powder admixture described in Example 1 and the total admixture was subsequently pressed into a 40 mil sheet. The various pressures employed and average voltage outputs obtained from three separate pieces of the conductive rubber sheet are reported in FIG. 3.

EXAMPLE 6

The procedure of Example 4 was followed (repeated) with the following modification being first mixing 8.33 grams of Silastic E Silicone RTV (Dow Corning Corp., Midland, Mich. 48640), 1.67 grams SE-33, and 1.3 grams Silastic E Curing Agent and second blending this mixture with 25.8 grams of Silver Powder C-200 (Metz Metallurgical Corp., So. Plainfield, N. J. 07080). The resultant product was a force sensor component with a high level of conductivity relative to conductive black loaded silicone force sensor components.

EXAMPLE 7

Ninety grams of the Parker Seal S-6600/SE-33/Varox Powder mixture described in Example 1 was admixed with 12 grams of Hi Sil T-600. Thirty one grams of this mixture was pressed to an approximately 50 mil thick sheet between two 5 mil polyethylene sheets. The uncured 50 mil thick silicone sheet was then placed between teflon release sprayed 5 mil ICI-505 polyester film and heat treated (2 minutes at 185° C.) coarse Emery Cloth (3M). This sandwich was placed between aluminum backup plates with a 32 mil chase and subjected to 8,000 pounds pressure for 20 minutes at 340° F. The cured conductive silicone force sensor component was postcured for 4 hours at 185° C. When tested at various pressures in the FIG. 1, 1A apparatus, the average voltage outputs obtained are as reported in FIG. 4.

EXAMPLE 8

Twenty grams of Elmer's Silicone Rubber Tub Caulk (Borden, Inc., Columbus, Ohio 43215) was mixed with 3 grams of Vulcan XC-72R carbon black (Cabot Corp., Boston, Mass. 02110). This admixture was knife coated to an approximately 20 mil thickness over a Medium grade of Emery Cloth (3M) and air cured at room temperature for about 18 hours. The smooth side of the molded, cured sheet was then bonded to a nylon stocking fabric by knife coating a layer of unfilled Elmer's silicone rubber into the fabric, applying to the smooth side of the molded, cured sheet to the knife coated layer and air curing the bonded layers at room temperature. The end product was a force sensor component that had good conductivity, and was soft, stretchable, strong and resistant to tear. When tested at various pressures in the FIG. 1, 1A apparatus, the average voltage outputs obtained are as reported in FIG. 5.

EXAMPLE 9

The following sandwich was prepared between two aluminum backup plates and a 33 mil aluminum chase: on the bottom a 7"×8" piece of medium Coarseness Emery Cloth (3M) with rough side up;
on top of the Emery Cloth was placed a 3"×4"×27 mil thick sheet of Conductive Vinyl (Abbey Corp., Hudson, Mass. 02111) with a 5 mil ICI-505 polyester release film placed between the Emery Cloth and the Conductive Vinyl sheet.

The above sandwich was placed in a press under 4,000 pounds of pressure for 1¼ minutes at 330° F. The sandwich was taken out of the press and cooled to room temperature. A thermoplastic conductive force sensor component was thus obtained.

EXAMPLE 10

400 grams of Parker Seal S1110-70 (a conductive carbon loaded silicone which when cured by itself has a hardness of 70 Shore A) and 400 grams of Parker Seal NPC-80 (a high durometer non-conductive silicone which when cured by itself has a hardness of 80 Shore A), was admixed with 4 grams of Varox powder to provide a high durometer conductive black silicone compound. Thirty-four grams of the admixture was pressed to an approximately 50 mil thick sheet.

The following sandwich with to and bottom aluminum backup plates and a 32 mil chase was placed in a press:

On the bottom backup plate was placed a coarse Emery Cloth (3M) with rough side up. Over the Emery Cloth was placed a 1 mil thick fluorinated ethylene propylene polymer release film. The 50 mil conductive black compound sheet was placed on top of the 1 mil release film with a 3 mil Teflon coated lass fabric release sheet placed on top of the 5 mil conductive black compound sheet. With a top backup plate, this sandwich was pressed under 8,000 pounds at 340° F. for 10 minutes.

The force sensor component was postcured at 185° C. for 4 hours. The durometer of this product was 79 Shore A.

Figure 6:
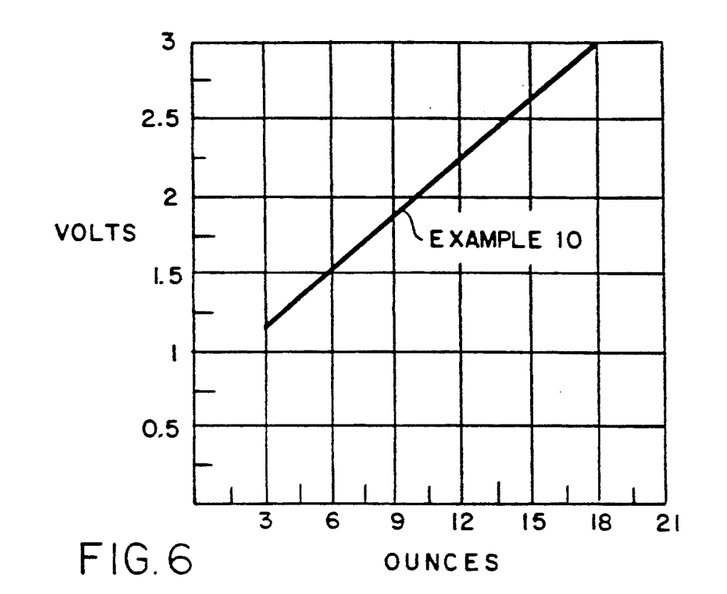
FIG. 6 is a plot of pressure versus voltage test data carried out on the force sensor material manufactured according to Example 10 as described hereinafter.
Figure 7:
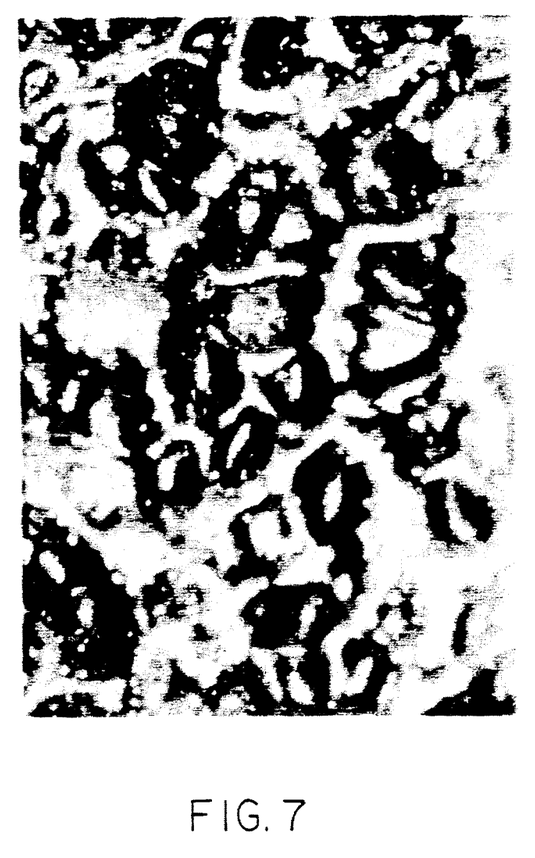
FIG. 7 is a magnified photograph (40x) of a portion of the ridged surface topography of the force sensor component described in Example 10.

FIG. 6 shows the pressure response of this material and FIG. 7 is a photograph of a portion of the rough surface under 40 times magnification showing an interconnected ridged surface topography.

EXAMPLE 11

The procedure of Example 10 was followed (repeated) with the following modification: a 40 mil sheet of RTP 199 x 50452A Conducive Black Polypropylene (RTP Co., Winona, Minn. 55987) was used in place of the silicone compound and the press time was 3 minutes instead of 10 minutes with no postcure.

The rigid conductive polypropylene component with molded in interconnecting ridges when compressed against a smooth conductive rubber electrical circuit surface demonstrated force sensor properties, i.e., variation in voltage versus applied pressure.

It will now be apparent to those skilled in the art that other embodiments, improvements. details, and uses can be made consistent with the letter and spirit of the foregoing disclosure and within the scope of this patent, which is limited only by the following claims, construed in accordance with the patent law, including the doctrine of equivalents.

What is claimed is:

1. A force sensor component comprising:
    a dimensionally stable body of electrically conductive material, the body having a selected outer surface formed into a predetermined topography;
    the body including an electrically conductive material in an amount sufficient to render the body electrically conductive at least throughout the selected outer surface of the body;
    the predetermined topography of the outer surface of the body comprising a plurality of adjoining ridges across the outer surface of the body.

2. The force sensor component of claim 1 wherein the stable body contains a polymer.

3. The force sensor component of claim 2 wherein the polymer is rendered electrically conductive by the addition of a conductive filler.

4. The force sensor of claim 3 wherein the polymer is compressible and resilient.

5. The force sensor component of claim 2 wherein the polymer is compressible and resilient.

6. The force sensor component of claim 1 wherein the electrically conductive material is homogeneously dispersed throughout the stable body.

7. The force sensor component of claim 6 wherein the electrically conductive material is selected from the group consisting of carbon powders, graphite powders, silver powders, silver flakes, noble metal powders, noble metal flakes, silver coated copper powder, silver coated nickel powder, silver nickel flakes, silver coated glass powder, silver coated aluminum powder, nickel powders, nickel flakes, nickel coated glass, aluminum powders, graphite fibers, metal fibers, chopped metal filaments, conductive metal powders, conductive metal flakes, conductive inorganics, conductive ceramics and mixtures of two or more of the forgoing.

8. The force sensor component of claim 1 wherein the electrically conductive material is selected from the group consisting of carbon powders, graphite powders, silver powders, silver flakes, noble metal powders, noble metal flakes, silver coated copper powder, silver coated nickel powder, silver coated nickel flakes, silver coated glass powder, silver coated aluminum powder, nickel powders, nickel flakes, nickel coated glass, aluminum powders, graphite fibers, metal fibers, chopped metal filaments, conductive metal powders, conductive metal flakes, conductive inorganics, conductive ceramics and mixtures of two or more of the foregoing.

9. The force sensor component of claim 7 or 8 wherein the polymer is selected from the group of thermoplastic and thermosetting form stable polymers.

10. The force sensor component of claim 7 or 8 wherein the polymer is a form stable compressible polymer.

11. The force sensor component of claim 7 or 8 wherein the polymer is a form stable compressible resilient polymer.

12. The force sensor component of claim 7 or 8 wherein the polymer is a rubber.

13. The force sensor component of claim 1 wherein the adjoining ridges have uppermost surfaces which extend laterally and are curved or curvilinear, the sides of the ridges flaring away from each other downwardly toward the base.

14. A combination of a force sensor component and a mold, comprising:
    a body of conductive compressible resilient material including a compressible resilient polymer material and a conductive filler dispersed throughout, said body having a selected outer surface having an irregular pattern formed thereon; and
    a mold in communication with the outer surface of the body having an inverse surface impression comprising the irregular pattern, said mold comprising a base surface having a plurality of inert particles deposited thereon and bonded thereto.

15. The combination of claim 14 when the maximum linear dimension of the particles of the mold is less than about 100 mils.

16. The combination of claim 14 wherein the irregular pattern comprises a plurality of adjoining ridges reinforcing each other against bending and buckling.

17. A combination of a force sensor component and a mold comprising:

a body of conductive compressible resilient material including a compressible resilient polymer material and a conductive filler dispersed throughout, the body having a selected outer surface having an irregular pattern formed thereon; and a mold comprising a unitary structure having a surface onto which is formed a contour having an inverse impression comprising a plurality of adjoining ridges.

18. The combination of claim 17 wherein the irregular pattern comprises a plurality of adjoining ridges reinforcing each other against bending and buckling.

* * * * *